United States Patent
Katou (10) Patent No.: US 8,223,374 B2
(45) Date of Patent: Jul. 17, 2012

(54) MAINTENANCE SYSTEM OF IMAGE FORMING APPARATUS AND MAINTENANCE METHOD OF THE SAME

(75) Inventor: Hiroyo Katou, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 711 days.

(21) Appl. No.: 12/435,636

(22) Filed: May 5, 2009

(65) Prior Publication Data

US 2009/0323103 A1 Dec. 31, 2009

Related U.S. Application Data

(60) Provisional application No. 61/076,274, filed on Jun. 27, 2008.

(30) Foreign Application Priority Data

Nov. 25, 2008 (JP) ................................. 2008-299922

(51) Int. Cl.
*G06F 3/012* (2006.01)
*G09B 5/004* (2006.01)
*H04N 1/00* (2006.01)

(52) U.S. Cl. ...................... 358/1.15; 358/1.14; 358/1.13; 358/504; 358/406; 704/246; 704/254; 704/E11.001; 704/E11.004; 704/200; 399/8; 399/9; 399/10; 434/319; 434/320; 434/321; 714/46; 710/15; 710/18

(58) Field of Classification Search ........ 358/1.11–1.18, 358/504, 406; 704/246, 254, E11.001, E11.004, 704/200; 399/8–10; 434/319–321; 714/46; 710/15–19
See application file for complete search history.

(56) References Cited

U.S. PATENT DOCUMENTS 5,392,095 A * 2/1995 Siegel ................................. 399/8
6,141,507 A * 10/2000 Sawada ............................. 399/8
(Continued)

FOREIGN PATENT DOCUMENTS

JP 2003-241581 8/2003
(Continued)

OTHER PUBLICATIONS

AGI Inc. web-page, "What's ST??," http://www.agi-web.co.jp/ST-EnglishHP/main.html, Feb. 12, 2009.

*Primary Examiner* — Twyler Haskins
*Assistant Examiner* — Chad Dickerson
(74) *Attorney, Agent, or Firm* — Turocy & Watson, LLP (57) ABSTRACT

A maintenance system of an image forming apparatus is composed of an image forming apparatus and a central management apparatus connected to it via a communication line. The image forming apparatus is composed of an image forming unit for forming an image, an information output unit for outputting intra-machine information of the image forming unit, a voice information input unit for inputting voice information of a user of the image forming unit, and a first communication controller for outputting the intra-machine information and voice information via the communication line. A central management apparatus is composed of a second communication controller connected to the communication line for inputting the intra-machine information and voice information which are outputted from the image forming apparatus, an emotional condition recognition unit for recognizing the emotional condition of the user of the image forming apparatus on the basis of the voice information received by the second communication controller, a support data storage unit for storing beforehand support information corresponding to the intra-machine information and emotional condition, a main controller for extracting the corresponding support information from the support information storage unit on the basis of the intra-machine information received by the second communication controller and the emotional condition of the user recognized by the emotional condition recognition unit, and an input/output unit for reporting the support information extracted by the main controller to an operator.

5 Claims, 11 Drawing Sheets

U.S. PATENT DOCUMENTS

| | | | |
|---|---|---|---|
| 6,185,534 B1 * | 2/2001 | Breese et al. | 704/270 |
| 6,665,085 B1 * | 12/2003 | Edmunds et al. | 358/1.15 |
| 2003/0033145 A1 * | 2/2003 | Petrushin | 704/236 |
| 2004/0260704 A1 * | 12/2004 | Moore | 707/100 |
| 2006/0281064 A1 * | 12/2006 | Sato et al. | 434/308 |

FOREIGN PATENT DOCUMENTS

| | | |
|---|---|---|
| JP | 2007-293877 | 11/2007 |

* cited by examiner

| | ANGER | PERPLEXITY | ORDINARY | .. |
|---|---|---|---|---|
| WRONG SIZE | CE NOTICATION | RESERVATION | RESERVATION | .. |
| SHEET FEED JAM | TELEPHONE CORRESPONDENCE | CE NOTICATION | RESERVATION | .. |
| FIXING JAM | EMERGENCY DISPATCH | EMERGENCY DISPATCH | CE NOTICATION | .. |
| SHEET DISCHARGE JAM | TELEPHONE CORRESPONDENCE | TELEPHONE CORRESPONDENCE | CE NOTICATION | .. |
| FIXING MOTOR ERROR | EMERGENCY DISPATCH | EMERGENCY DISPATCH | CE NOTICATION | .. |
| : | : | : | : | : |

| DATE | CUSTOMER NUMBER | MESSAGE | EMOTION | ERROR | CAUSE | COUNTER | ... |
|---|---|---|---|---|---|---|---|
| 20080729 | 020806 | EMERGENCY VISIT | PERPLEXITY | FIXING JAM | TONER ADHESION | 50820 | ... |
| 20080729 | 050211 | RESERVATION | ORDINARY | SHEET FEED JAM | SKEW | 100472 | ... |
| ⋮ | ⋮ | ⋮ | ⋮ | ⋮ | ⋮ | ⋮ | ⋮ |

FIG. 15

MAINTENANCE SYSTEM OF IMAGE FORMING APPARATUS AND MAINTENANCE METHOD OF THE SAME

CROSS-REFERENCE TO RELATED APPLICATION

This application is based upon and claims the benefit of priority from the prior U.S. Patent Application No. 61/076,274, filed on Jun. 27, 2008 and Japanese Patent Application No. 2008-299922, filed on Nov. 25, 2008; the entire contents of all of which are incorporated herein by reference.

FIELD OF THE INVENTION

The present invention relates to a maintenance system of an image forming apparatus and a maintenance method of the image forming apparatus.

DESCRIPTION OF THE BACKGROUND

In recent years, when a user operates an image forming apparatus and a difficulty happens or the operation method is unknown, a system which is automatically connected to a support center (a central management apparatus) using a network or a telephone line connected with the concerned image forming apparatus and is supported has been proposed. The maintenance system disclosed in Japanese Patent Application Publication No. 2004-364205, when a difficulty happens in the image forming apparatus, transmits the intra-machine information of the image forming apparatus to the support center. On the basis of the transmitted intra-machine information of the image forming apparatus, using the network or telephone line connected with the image forming apparatus, a person in charge of the support center corresponds to the user by voice.

In a conventional maintenance system of the image forming apparatus, when a failure occurs in a device, the intra-machine information of the device is transmitted to the support center and on the basis of the transmitted intra-machine information, a maintenance service is selected at the support center. However, in the system, no maintenance service in consideration of the emotional condition of the user of the device at that time is performed.

SUMMARY OF THE INVENTION

An object of the present invention is to provide a maintenance system of an image forming apparatus, when selecting a maintenance service, capable of proposing a more careful maintenance service by including the emotional condition of the user in the consideration and a maintenance method of the image forming apparatus.

In an aspect of the present invention, a maintenance system of the image forming apparatus is provided and the maintenance system of the image forming apparatus comprises an image forming apparatus including: an image forming unit configured to form an image; an information output unit configured to output intra-machine information of the image forming unit; a voice information input unit configured to input voice information of a user of the image forming unit; and a first communication controller configured to output the intra-machine information and the voice information via a communication line; and a central management apparatus including: a second communication controller connected to the communication line to input the intra-machine information and voice information outputted from the image forming apparatus; an emotional condition recognition unit configured to recognize the emotional condition of the user using the image forming apparatus on the basis of the voice information received by the second communication controller; a support data storage unit configured to store beforehand support information corresponding to the intra-machine information and the emotional condition; a main controller configured to extract the corresponding support information from the support information storage unit on the basis of the intra-machine information received by the second communication controller and the emotional condition of the user recognized by the emotional condition recognition unit; and an input/output unit configured to reporting the support information extracted by the main controller to an operator.

Furthermore, in an aspect of the present invention, a maintenance system of the image forming apparatus is provided and the maintenance system of the image forming apparatus comprises an image forming apparatus including: an image forming unit configured to form an image; an information output unit configured to output intra-machine information of the image forming unit; a voice information input unit configured to input voice information of a user of the image forming unit; an emotional condition recognition unit configured to recognize the emotional condition of the user using the image forming apparatus from the voice information inputted by the voice information input unit; and a first communication controller configured to output the intra-machine information and the emotional condition information via a communication line; and a central management apparatus including: a second communication controller connected to the communication line to input the intra-machine information and emotional condition information outputted from the image forming apparatus; a support data storage unit configured to store beforehand support information corresponding to the intra-machine information and the emotional condition information; a main controller configured to extract the corresponding support information from the support information stored by the support information storage unit on the basis of the intra-machine information received by the second communication controller and the emotional condition of the user; and an input/output unit configured to report the support information extracted by the extraction means to an operator.

Further, in an aspect of the present invention, a maintenance method of an image forming apparatus of a system composed of the image forming apparatus and a central management apparatus connected to the image forming apparatus via a communication line is provided and the maintenance method comprises transmitting intra-machine information of the image forming apparatus to the central management apparatus via the communication line; permitting at least one of the image forming apparatus and the central management apparatus to recognize an emotional condition of the user on the basis of voice information of a user using the image forming apparatus; and reporting support information corresponding to the intra-machine information and the recognized emotional condition to an operator of the central management apparatus.

DETAILED DESCRIPTION OF THE INVENTION

Hereinafter, the embodiments of the present invention will be explained with reference to the accompanying drawings.

First Embodiment

Figure 1:
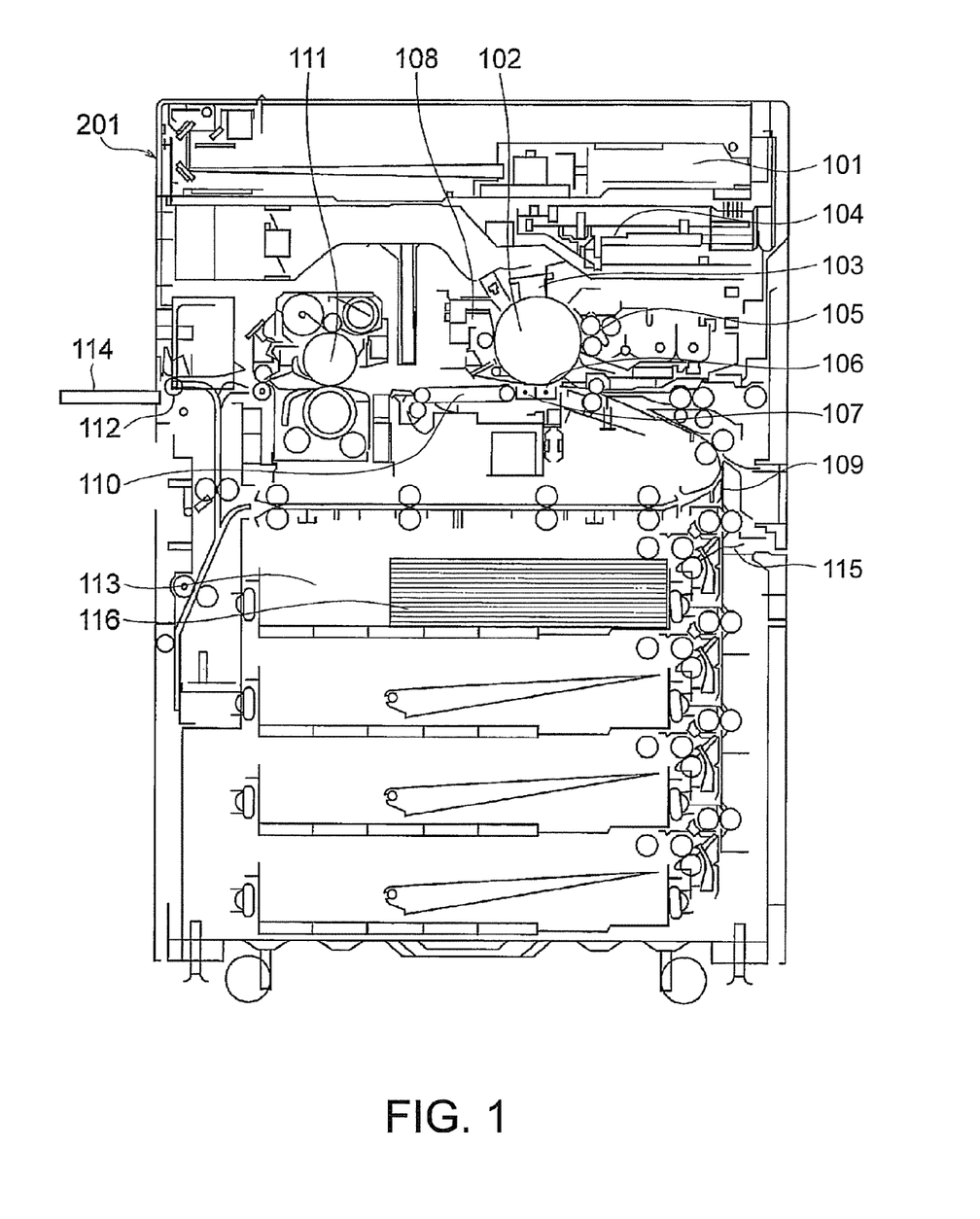
FIG. 1 is a cross sectional view showing the internal structure of the image forming apparatus connected to the central management apparatus via the communication line.

FIG. 1 is a cross sectional view showing the constitution of the image forming unit of the image forming apparatus relating to the present invention. An image forming apparatus 201 includes a controller 101, a photosensitive drum 102, a main charger 103, a scanning exposure 104, a developing device 105, a transferring charger 106, a separating charger 107, a cleaner 108, a sheet supplying unit 109, a sheet conveyor 110, a fixing device 111, a sheet discharge unit 112, and a sheet receiving tray 114.

The photosensitive drum 102 rotates in the sub-scanning direction (in the peripheral direction of the photosensitive drum). In the neighborhood of the periphery of the photosensitive drum 102, the main charger 103 for uniformly charging the photosensitive drum 102 is arranged. The scanning exposure 104 emits light and turns off according to an image signal by scanning the semiconductor laser in the scanning exposure 104. The laser beam emitted from the semiconductor laser is changed to light for scanning in the main scanning direction (in the direction of the rotary shaft of the photosensitive drum) by the deflector such as a polygonal mirror. And, by the optical system such as a lens, the laser beam is irradiated onto the photosensitive drum 102. If the laser beam is irradiated to the charged photosensitive drum 102, the potential of the irradiated part lowers and an electrostatic latent image is formed.

The developing device 105 supplies a developer to the photosensitive drum 102, thereby forms a toner image on the photosensitive drum 102. On the other hand, at the bottom of the image forming apparatus 201, a sheet stack tray 113 is installed. Sheet feed rollers 115 separate sheets 116 on the sheet stack tray 113 one by one and send them to the sheet supplying unit 109. The sheet supplying unit 109 supplies the sheets 116 up to the transfer position of the photosensitive drum 102. The transferring charger 106 transfers the toner image to the supplied sheets 116 from the rotary drum 102. The separating charger 107 separates the sheets 116 from the photosensitive drum 102.

The sheets 116 to which the toner image is transferred are conveyed by the sheet conveyor 110 and the toner image is fixed to the sheets 116 by the fixing device 111. The sheet discharge unit 112 discharges the sheets 116 on which the image is formed to the sheet receiving tray 114. Further, after the transfer of the toner image to the sheets 116 is finished, the residual toner on the photosensitive drum 102 is removed by the cleaner 108 and the photosensitive drum 102 is returned to its initial condition and enters the standby condition for the next image formation.

The aforementioned process is repeated, thus the image forming operation of the image forming apparatus is performed continuously.

Next, the image forming apparatus and central management apparatus will be explained.

Figure 2:
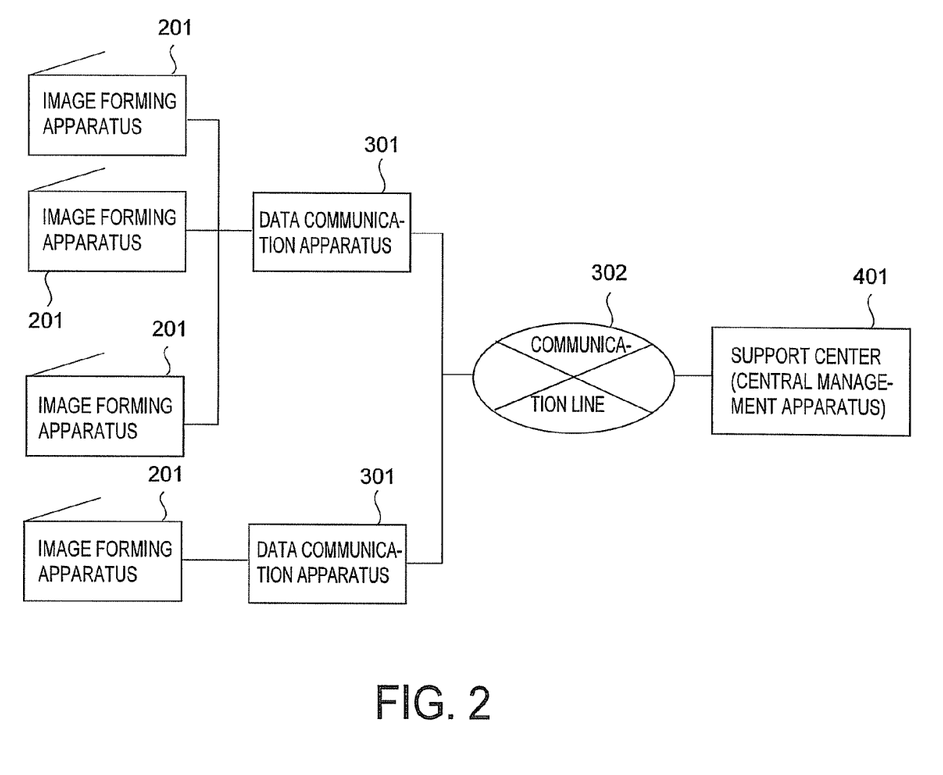
FIG. 2 is a block diagram showing the maintenance system of the image forming apparatus.

FIG. 2 is a block diagram showing an embodiment of the maintenance system of the image forming apparatus.

Many image forming apparatuses 201 installed at the working location such as a user's office are respectively connected to a support center (a central management apparatus) 401 for managing the image forming apparatuses 201 via a data communication device 301 and a communication line 302.

The data communication device 301 controls the communication between each of the image forming apparatuses 201 and the support center 401. The data communication device 301 can be installed so as to be connected to an existing line of the user. To the data communication device 301, a plurality of or a single image forming apparatus 201 can be connected. Further, the image forming apparatuses do not need to be of the same type and may be of different kinds. Further, as a communication line 302, a public transmission circuit network such as an Internet circuit or a telephone circuit (other communication lines are acceptable) can be used.

Figure 3:
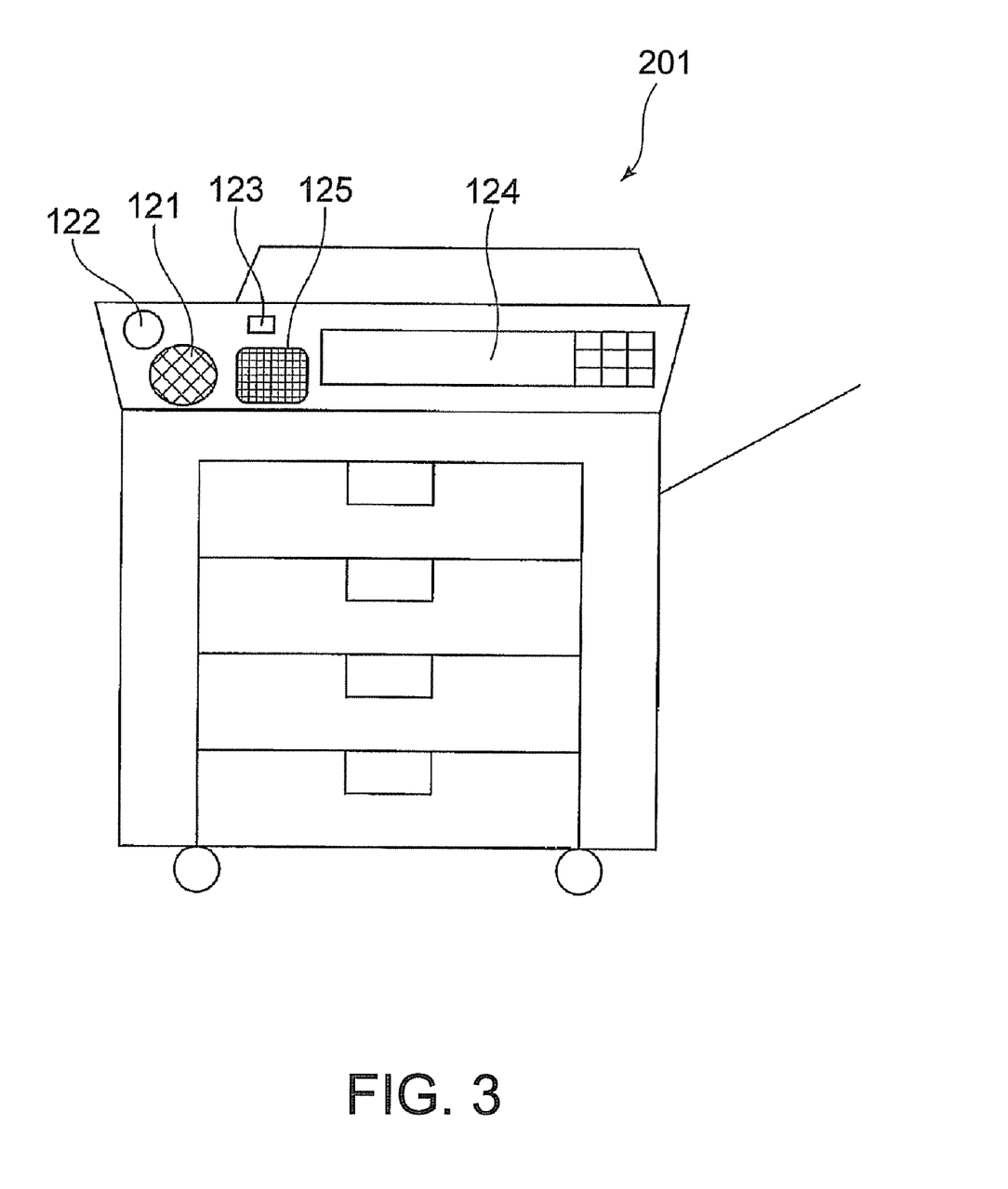
FIG. 3 is a schematic view showing the appearance of the image forming apparatus connected to the central management apparatus via the communication line.

FIG. 3 is a schematic view showing the appearance of the image forming apparatus 201 of this embodiment.

The image forming apparatus 201 includes a microphone 121, a lamp 122, a call button 123, a control panel 124, and a speaker 125. When a failure occurs in the image forming apparatus 201, the user presses the call button 123 and requests connection to the service center 401. And, if the image forming apparatus is connected to the support center 401, the user inputs voice from the microphone 121 by hearing the response from the support center 401 from the speaker 125. Further, during the connection of the image forming apparatus 201 to the support center 401, the lamp 122 is kept on, thus the user can confirm the communication with the support center 401 and can communicate with it at ease.

Figure 4:
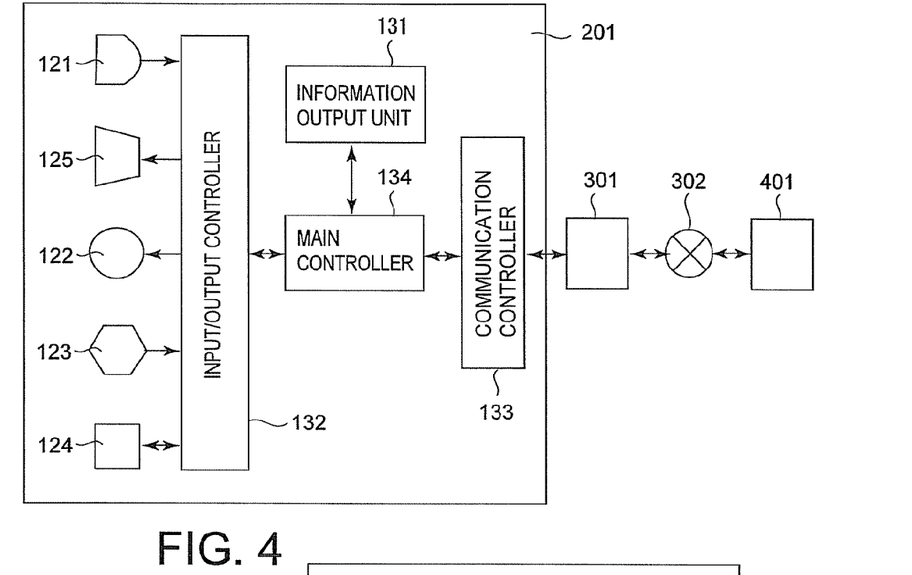
FIG. 4 is a block diagram showing the control of the image forming apparatus of the first embodiment of the present invention.

FIG. 4 is a block diagram showing the control of the image forming apparatus 201.

The image forming apparatus 201 includes an information output unit 131 for outputting the intra-machine information, an input/output controller 32 for inputting voice information of the user and outputting a response from the support center 401, a communication controller 133 for communicating with the support center 401, and a main controller 134 for controlling the overall information in the image forming apparatus 201. To the input/output controller 132, the microphone 121, lamp 122, call button 123, control panel 124, and speaker 125 which are shown in FIG. 3 are connected.

By use of such a constitution, the image forming apparatus 210 transmits the intra-machine information, user's voice information, and customer information to the support center 401 via the data communication device 301 and communication line 302. Further, the intra-machine information indicates the detection values of the temperature and humidity sensor and paper sensor which are mounted in the image forming apparatus, printing conditions, and job history. Further, the customer information indicates the information of the use environment such as the information for identifying a customer (name, place to make contact, etc.), the accumulative number of printed sheets (copy volume) of the image forming apparatus 201, and the color print ratio. The printing conditions indicate the number of sheets to be printed, which one to be selected, one-side print or double-side print, and the sheet size necessary for printing.

Figure 5:
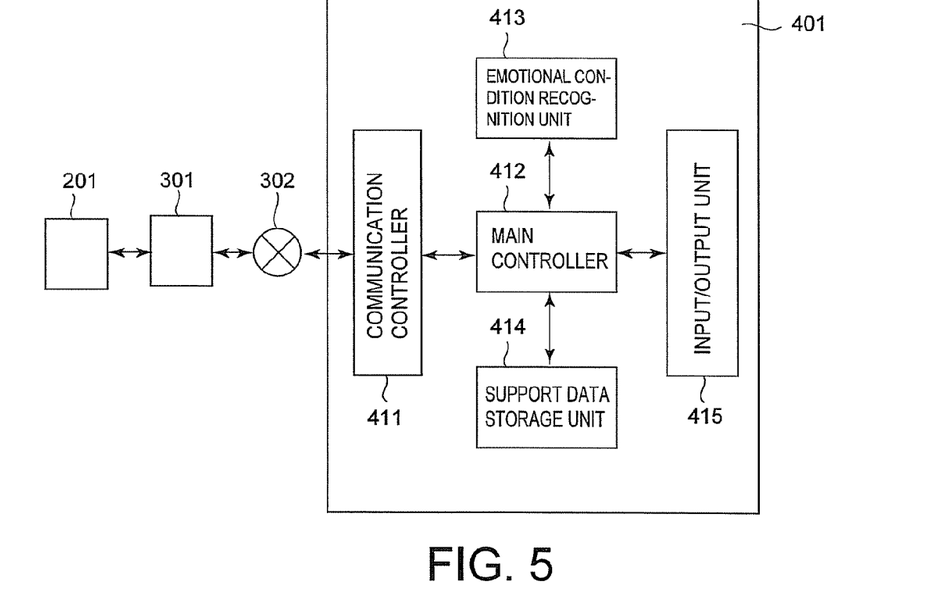
FIG. 5 is a block diagram showing the control of the support center of the first embodiment of the present invention.

FIG. 5 is a block diagram showing the control of the support center 401.

The support center 401 connected to the image forming apparatus 201 via the communication line includes a communication controller 411 for communicating with the image forming apparatus 201, a main controller 412 for controlling information, an emotional condition recognition unit 413 for recognizing the emotional condition from the voice information of the user, a support data storage unit 414 for storing beforehand the support information recommended in correspondence with the intra-machine information and user's emotional condition, and an input/output unit 415 for indicating the support service recommended to the operator.

By use of such a constitution, the support center 401 receives the information transmitted by the image forming apparatus 201, analyzes the received information by the main controller 412, and can indicate the maintenance service recommended from the received information and analytical results from the input/output unit 415 to the operator. Further, the operator refers to the analytical results via the input/output unit 415, thereby can inform the user, for example, by a telephone call.

Next, the notification procedure by a user from the image forming apparatus 201 to the support center 401 will be explained.

Figure 6:
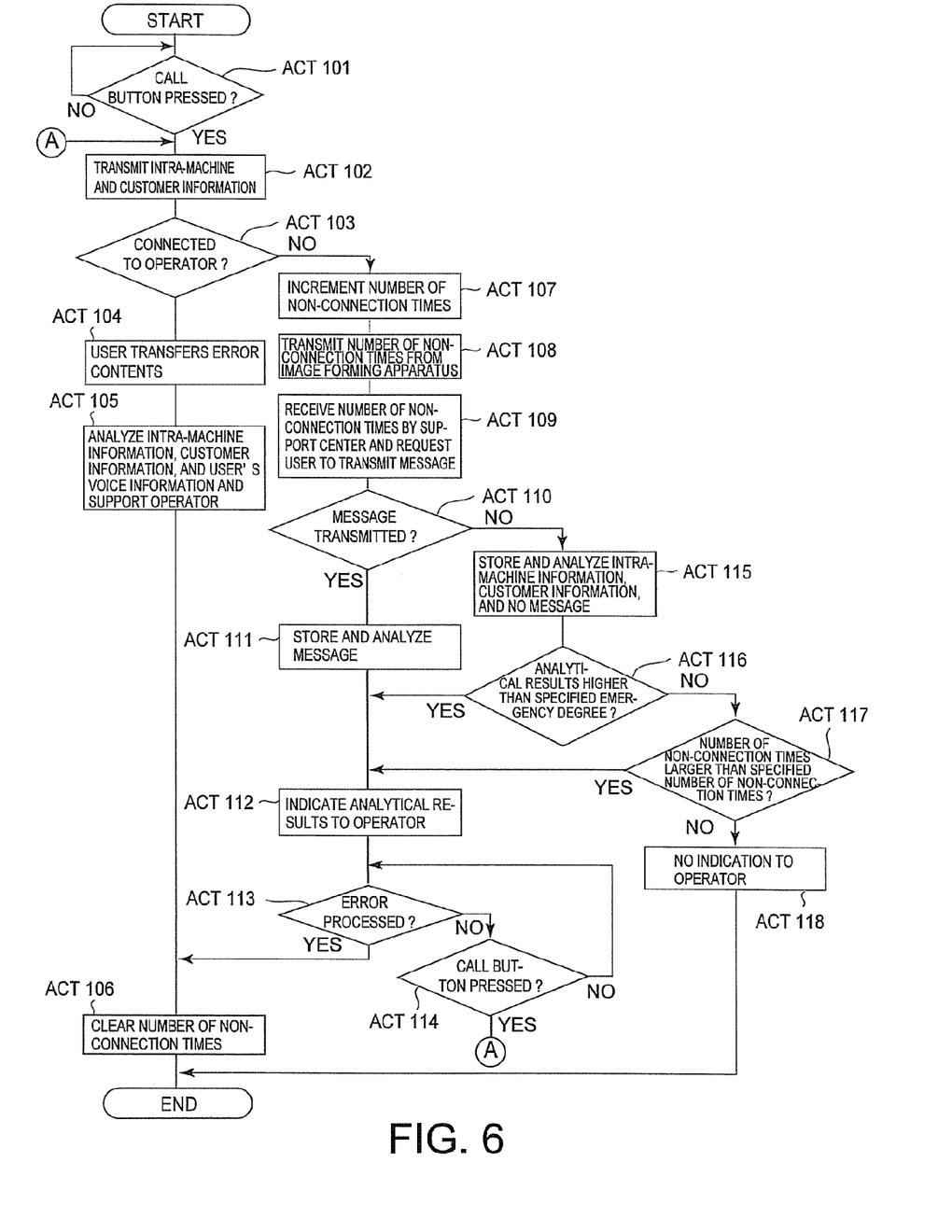
FIG. 6 is a flow chart showing the processing when an abnormal phenomenon occurs in the image forming apparatus of the first embodiment of the present invention.

FIG. 6 is a flow chart showing the processing by a user when an abnormal phenomenon occurs in the image forming apparatus 201. Firstly, the image forming apparatus 201 checks whether the user presses the call button 123 or not (Act 101). As a result of the check, when the call button is pressed, the image forming apparatus 201 transmits the intra-machine information and customer information to the support center 401 (Act 102). And, the image forming apparatus 201 checks whether it is connected to the operator of the support center 401 or not (Act 103). When it is connected to the operator, the user transfers the error contents by voice to the operator (Act 104). Further, the condition that the image forming apparatus 201 is connected to the operator indicates the condition under which the user of the image forming apparatus can communicate with the operator via the communication line 302 and it means that by the realization of the communicatable condition, the connection can be established.

At this time, the support center 401 analyzes the transmitted intra-machine information and customer information and the voice information of the user and supports the operator (Act 105). Firstly, it infers the error factor from the analysis of the transmitted intra-machine information. And, it infers the emotional condition of the user from the analysis of the voice information of the user.

Further, the emotional condition recognition unit 413 analyzes the voice information of the user. The technology of recognizing the emotional condition uses the sensibility technology (hereinafter, abbreviated to ST). The ST is referred to as a fundamental technology of intending to quantitatively visualize the human mind and sensitivity from the human structure (speaking structure), brain activity, body reaction, and change in the living body substance. As one of the ST, a means for detecting a robust fundamental frequency from the voice rhythm information and detecting the human feeling from a parameter obtained by confirming the consistency of the voice feeling with the brain activity is known (refer to Japanese Patent Application Publication No. 2002-91482). By use of such a technology, the emotional condition can be inferred from the voice information of the user.

Figure 7:
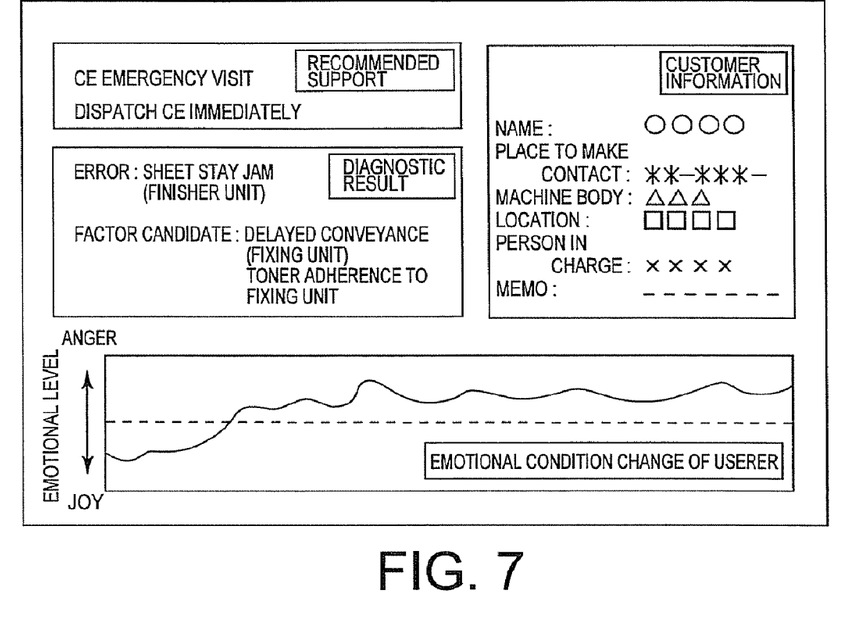
FIG. 7 is an example of a screen for displaying the recommended maintenance service and the change diagram of the emotional condition of a user in the support center.
Figure 8:
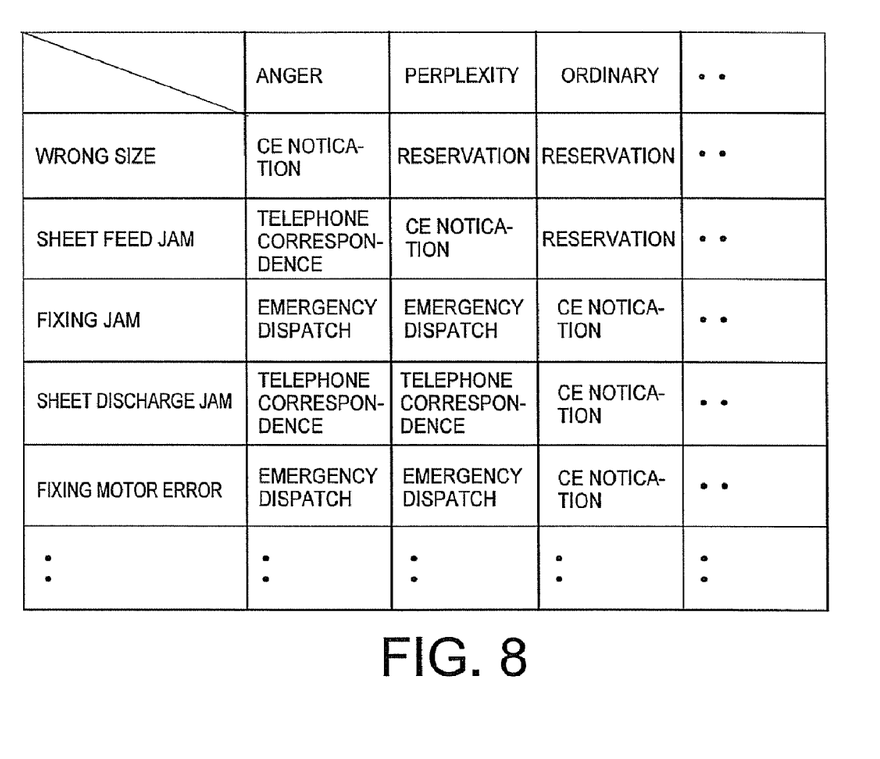
FIG. 8 is a table showing the support information composed of the analytical results of the intra-machine information and emotional condition information of the user which correspond to each other.

FIG. 7 shows an example of the support screen displayed on the support center 401 when the communication from the user of the image forming apparatus 201 is connected to the operator. As shown in FIG. 7, on the support screen, the recommended maintenance service (recommended support), the analytical results of the intra-machine information (diagnostic results), and the change diagram of the customer information and user's emotional condition are displayed. Further, in the support center 401, the information of the maintenance service recommended in correspondence with the analytical results of the intra-machine information of the image forming apparatus 201 and user's emotional condition is stored beforehand in the support data storage unit 414. FIG. 8 shows an example of the table showing the support information corresponding to the analytical results of the intra-machine information and user's emotional condition which are stored in the support center 401. In the table, the analytical results of the intra-machine information are shown on the first row, and the user's emotional condition is shown on the first line, and at each place where they cross each other, the contents of the maintenance serve recommended when it is conformed to the condition are stored.

For example, when a sheet feed jam occurs in the image forming apparatus 201, if the user's emotional condition is judged as "ordinary", it is judged as a problem at a not-very high emergency degree, and the correspondence is brought into "reservation". However, when the user's emotional condition is judged as "angry", the emergency degree rises and the measure of "telephone correspondence" is a recommended support. In this way, from the support information corresponding to the intra-machine information and user's emotional condition which are stored beforehand in the support center 401, the maintenance service is selected. The results are displayed for the operator and execution by the operator is instructed.

Further, when selecting such a maintenance service, it can be selected in consideration of the customer information (the working environment of the user, copy volume, etc.). In this case, a plurality of tables of the support information shown in FIG. 8 may be stored in accordance with the step of the copy volume.

Next, at the Action 103 shown in FIG. 6, the case that the communication of the user of the image forming apparatus is not connected to the operator will be explained. When the communication from the user is not connected to the operator, the image forming apparatus 201 counts the number of non-connection times (Act 107) and transmits the number of non-connection times to the support center 401 (Act 108). With respect to the number of non-connection times, even if the image forming apparatus 201 tries communication connection, it is not connected and the number of tried connection times is counted as a number of non-connection times. The count is transmitted to the support center 401. The support center 401 receives the number of non-connection times transmitted from the image forming apparatus 201 and requests the user so as to transmit a voice message informing the error contents (Act 109).

The support center 401 receives the number of non-connection times transmitted from the image forming apparatus 201 and then judges whether the voice message informing the error contents is transmitted from the user or not (Act 110). When the user transmits the voice message, the support center 401 stores the received intra-machine information and customer information and the voice message of the user and analyzes the intra-machine information and the emotional condition of the user from the voice message (Act 111).

And, the support center 401 judges the analytical results of the intra-machine information and the emotional condition of the user in combination with each other, thus an appropriate maintenance service is selected. Further, even in this case, when selecting the maintenance service, it can be selected in consideration of the customer information.

Figure 9:
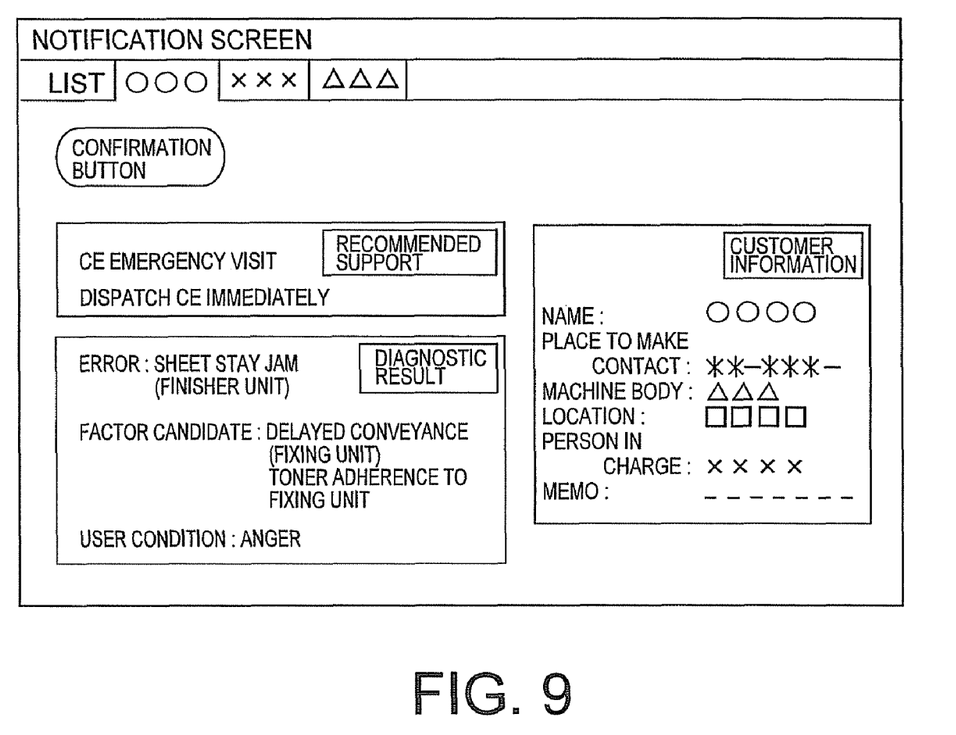
FIG. 9 is an example of a screen, when the apparatus is not connected to an operator, for reporting the maintenance support selected from analysis of a voice message of the user to the operator or a serviceman.

If the recommended maintenance service is selected, the support center 401 notifies the analytical results of the intra-machine information, the emotional condition inference results, and the selected maintenance service to the operator (Act 112). FIG. 9 shows an example of the notification screen to the operator. Thereafter, depending on whether the operator presses the confirmation button of the notification screen or not, whether the operator copes with the error or not is judged (Action 113). When the error is not confirmed by the operator, whether the user of the image forming apparatus 201 presses again the call button 123 or not is judged (Act 114). When the call button is pressed by the user (YES at Act 114), the process is returned to Act 102. When the call button is not pressed (NO at Act 114), the operator is notified continuously.

Further, while the user of the image forming apparatus 201 transmits the voice message to the support center 401 and then the processes by the support center 401 (Acts 111 to 113) are performed, a case that the error is recovered by the user himself may be considered. In this case, it is possible to perceive that the image forming apparatus 201 returns to the normal operation, clear the number of non-connection times to 0, transmit the purport of recovery of the error to the support center 401, and stop the processing of the support center 401.

At Act 110, when the voice message is not transmitted from the user of the image forming apparatus 201, the support center 401 analyzes the received intra-machine information and selects the maintenance service (Act 115). And, it judges whether the emergency degree of the selected maintenance service is higher than a predetermined threshold value or not (Act 116). When the emergency degree of the selected maintenance service is higher than the threshold value, the support center 401 notifies it to the operator.

For example, as an example of the maintenance service shown in the table in FIG. 8, "emergency dispatch", "telephone correspondence", "CE (customer engineer) notification", and "reservation" may be cited. "Emergency dispatch" is indicated when it is necessary to immediately dispatch a CE. "Telephone correspondence" is indicated, although it is not necessary to immediately dispatch a CE, when it is necessary to contact the user of the image forming apparatus 201 and indicate an error recovery plan. "CE notification" is indicated, although it is necessary to judge the error recovery plan by a serviceman, when it is not necessary to immediately contact the user of the image forming apparatus 201. "Reservation" is indicated when it is considered that there is no need to immediately deal with recovery of the error.

Namely, the maintenance services are lined up as follows in the descending order of emergency degree: "emergency dispatch", "telephone correspondence", "CE notification", and "reservation". At this time, if the threshold value of the emergency degree is decided as "CE notification", when "emergency dispatch", "telephone correspondence", and "CE notification" are indicated for the operator as recommended maintenance services, the emergency degree of the maintenance services is regarded as higher than the predetermined threshold value of the emergency degree and it is notified to the operator.

When the emergency degree of the selected maintenance service is higher than the threshold value like this, it is considered that it is necessary to execute immediately the maintenance service and it is notified to the operator (Act 112).

When the emergency degree of the selected maintenance service is lower than the threshold value, the main controller 412 judges whether the number of non-connection times is larger than a predetermined specified number of times or not (Act 117). When the number of non-connection times is larger than the predetermined specified number of times, the image forming apparatus 201 and analytical results of the voice information of the user are notified to the operator (Act 112). If the number of non-connection times is increased, the mental state of the user is increased in the anger, so that the main controller 412 switches to a maintenance service (support) in a higher emergency degree.

Further, the number of non-connection times, when the operator confirms the notification, is cleared to 0 (Act 106).

Figure 10:
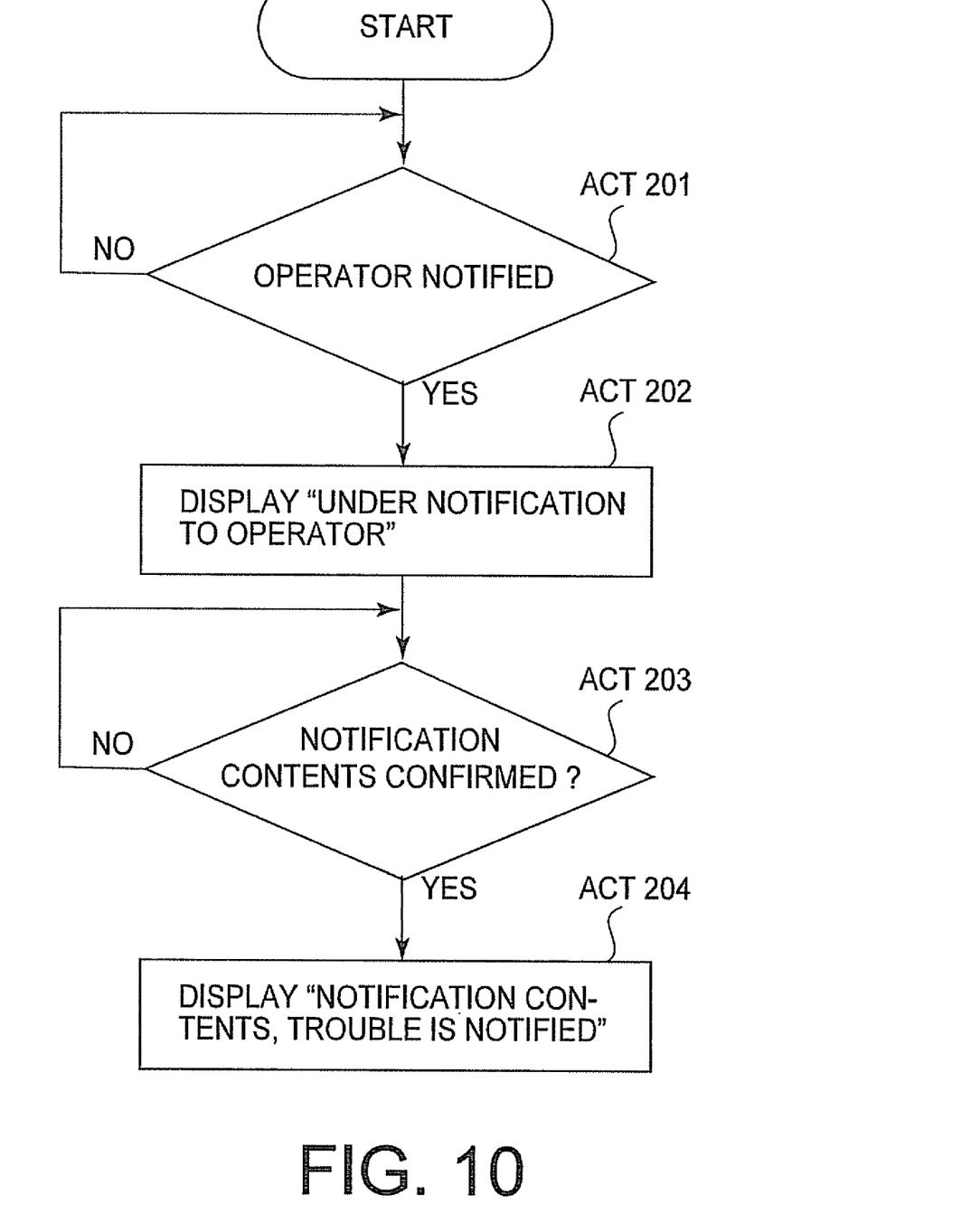
FIG. 10 is a flow chart, when the apparatus is not connected to the operator, showing the processing to be performed to inquire the control panel of the image forming apparatus and display the processing condition.

Further, when the communication from the user of the image forming apparatus 201 is not connected to the operator, on the control panel 124 of the image forming apparatus 201, the processing condition of the inquiry is displayed. The flow chart of the processing performed when the inquiry processing condition is displayed on the control panel 124 is shown in FIG. 10.

Firstly, the image forming apparatus 201 judges whether the analytical results of the transmission data are notified to the operator and serviceman or not (Act 201). When the analytical results are notified to the operator and serviceman, a control signal displaying the purpose of under notification to the control panel 124 is transmitted from the support center 401 to the image forming apparatus 201 (Act 202). And, the support center 401 judges whether the operator and serviceman confirm the notification contents or not (Act 203). When the operator and serviceman confirm the notification contents, an instruction is transmitted from the support center 401 so as to display "Notification contents: Trouble is notified." on the control panel of the image forming apparatus 201 (Act 204).

Further, in this embodiment, the intra-machine information of the image forming apparatus 201 and customer information are transmitted to the support center 401 after the user presses the call button. However, if an error of the image forming apparatus 201 is detected, it is possible to automatically transmit the intra-machine information and customer information to the support center 401. In this case, immediately after an abnormal phenomenon happens in the image forming apparatus 201, the intra-machine information and customer information are automatically transmitted to the support center 401. Therefore, before the user inquires the support center 401, from analysis of the intra-machine information, the error results can be inferred beforehand. Therefore, the support center 401 can cope with the abnormal phenomenon of the image forming apparatus 201 more quickly.

Second Embodiment

Figure 11:
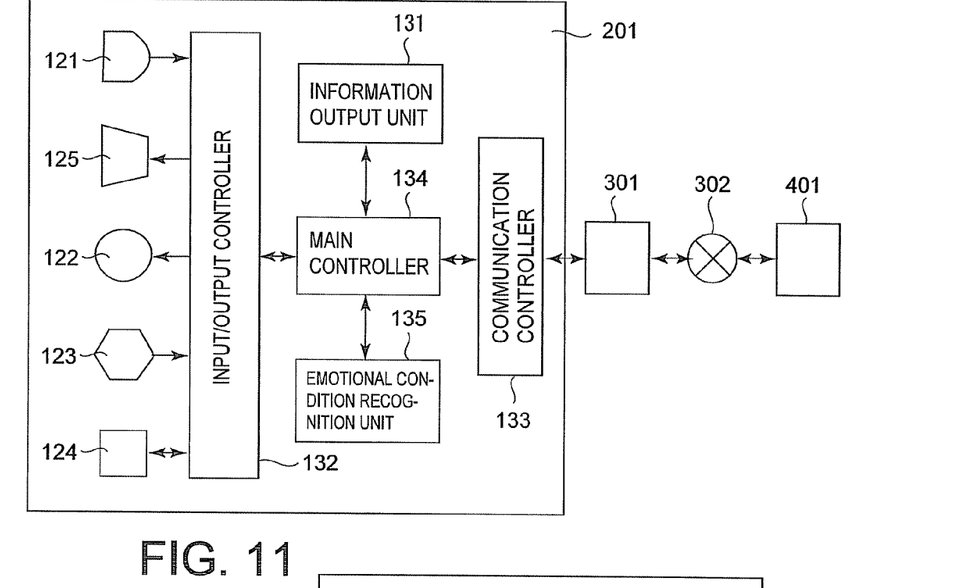
FIG. 11 is a block diagram showing the control of the image forming apparatus of the second embodiment of the present invention.
Figure 12:
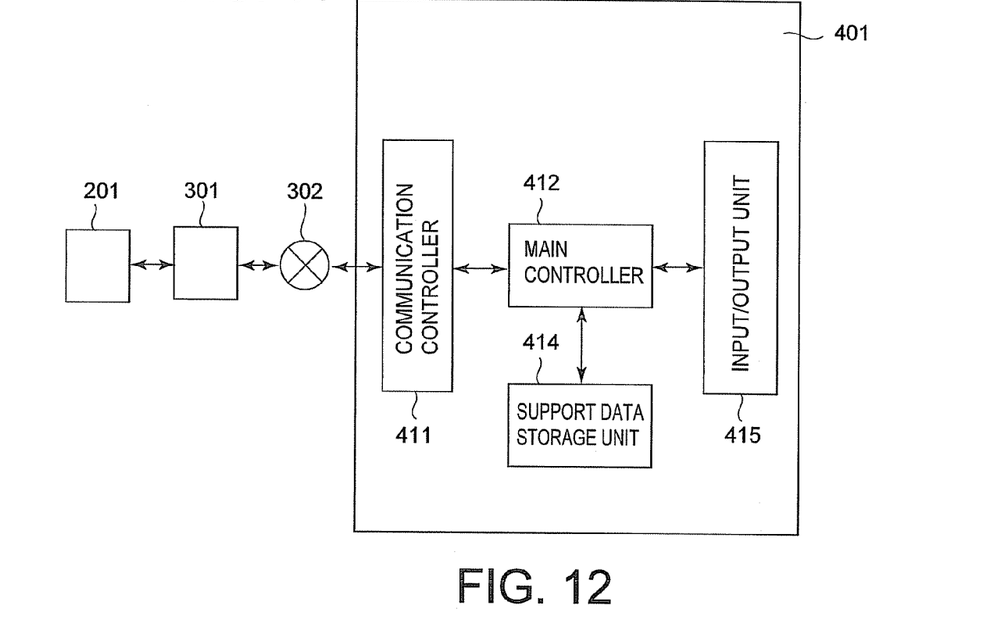
FIG. 12 is a block diagram showing the control of the support center of the second embodiment of the present invention.
Figure 13:
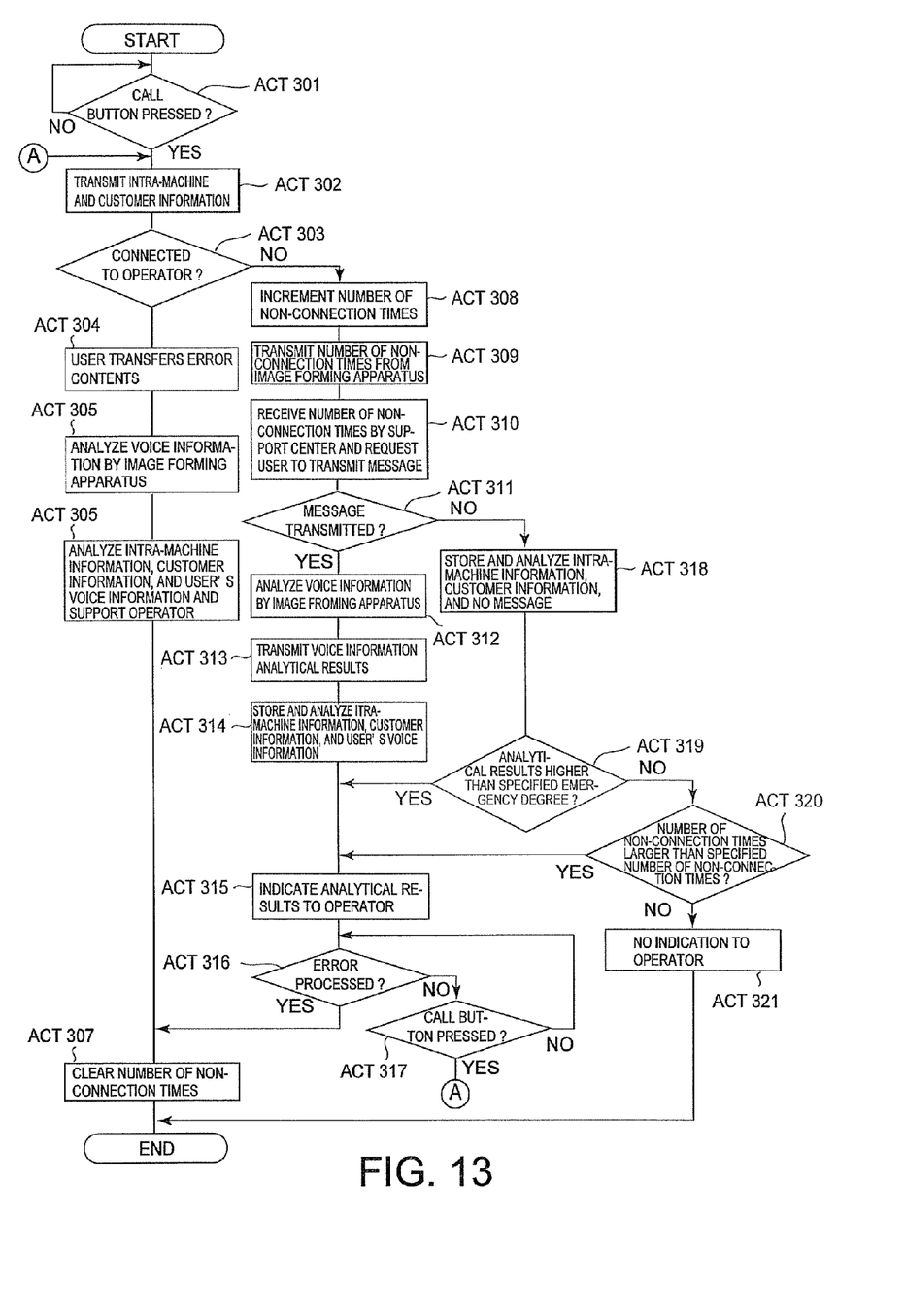
FIG. 13 is a flow chart showing the processing when an abnormal phenomenon occurs in the image forming apparatus of the second embodiment of the present invention.

FIGS. 11 to 13 show the second embodiment and FIG. 11 is a block diagram showing the constitution of the image forming apparatus 201 of this embodiment.

The image forming apparatus 201 includes the information output unit 131 for controlling the intra-machine information such as the intra-machine detected value, log information, and printing conditions of the image forming apparatus 201, the input/output controller 132 for inputting voice information of a user and outputting a response from the support center 401, the emotional condition recognition unit 135 for analyzing the voice information of the user and inferring an emotional condition of the user, the communication controller 133 for communicating with the support center 401, and the main controller 134 for controlling the overall information in the image forming apparatus. Further, the inference of the emotional condition from the voice information performed by the emotional condition recognition unit 135 in the image forming apparatus 201 is performed using the ST similarly to the first embodiment.

FIG. 12 is a block diagram showing the constitution of the support center 401 of this embodiment.

The support center 401 connected to the image forming apparatus 201 via the communication line includes the communication controller 411 for communicating with the image forming apparatus 201, the main controller 412 for controlling information, the support data storage unit 414 for storing beforehand the support information recommended in correspondence with the intra-machine information and user's emotional condition, and the input/output unit 415 for indicating the support service recommended to the operator and serviceman.

By use of such a constitution, the support center 401 receives the information transmitted by the image forming apparatus 201, analyzes the received information by the main controller 412, and indicates the received information and the support information inferred from the analytical results from the input/output unit 415 to the operator and serviceman. Further, the operator and serviceman refer to the analytical results via the input/output unit 415 and contact the user by a telephone call.

FIG. 13 shows a flow chart showing the processing when an abnormal phenomenon occurs in the image forming apparatus 201. At the stages from the occurrence of the abnormal phenomenon in the image forming apparatus 201 to the check (Act 303) for whether it is connected to the operator of the support center 401 or not, the flow of this embodiment is the same as that of the first embodiment. When the image forming apparatus 201 is connected to the operator, the user notifies the error information of the image forming apparatus 201 to the operator (Act 304). At that time, the voice information of the user inputted from the microphone 121 is analyzed by the emotional condition recognition unit 135 in the image forming apparatus 201 and the emotional condition of the user is inferred (Act 305).

Thereafter, the inferred results of the emotional condition of the user in the image forming apparatus 201 are notified to the support center 401. The support center 401 analyzes the intra-machine information sent from the image forming apparatus 201 and infers an error factor. Further, the support center 401 stores beforehand the information of the maintenance support in which the analytical results of the intra-machine information and the emotional condition of the user correspond to each other (refer to FIG. 8). Using the information, the support center 401 selects an appropriate maintenance service from the error factor obtained from the analytical results of the intra-machine information and the inferred results of the emotional condition of the user sent from the image forming apparatus 201. Furthermore, the support center 401 selects the operator corresponding to the maintenance service, indicates the results to the operator, and supports the operator (Act 306).

Acts 304 to 306 are repeated until the telephone call between the user of the image forming apparatus 201 and the operator is finished and an appropriate maintenance service is indicated whenever necessary. Further, when selecting the maintenance service, it can be selected in consideration of the customer information (the working environment of the user, copy volume, etc.).

Next, at Act 303, when the communication from the user of the image forming apparatus 201 is not connected to the operator, the image forming apparatus 201 counts the number of non-connection times (Act 308) and transmits the number of non-connection times to the support center 401 (Act 309). The support center 401, after receiving the number of non-connection times, requests the user to transmit a voice message (Act 310). Next, the support center 401 judges whether the voice message is input or not (Act 311). When the user inputs the voice message, the emotional condition recognition unit 135 analyzes the emotional condition of the user from the voice message (Act 312). The emotional condition recognition unit 135 notifies the analytical results of the voice information to the support center 401 (Act 313).

The support center 401 stores and analyzes the received intra-machine information and customer information and the emotional condition information of the user (Act 314). The support center 401 judges the analytical results of the intra-machine information and the emotional condition of the user in combination with each other, thereby indicates an appropriate maintenance service to the operator. Further, even in this case, when selecting the maintenance service, it can be selected in consideration of the customer information.

Thereafter, depending on whether the operator presses the confirmation button on the notification screen or not, it is judged whether the operator copes with the error or not (Act 316). When the error is not confirmed by the operator (NO at Act 316), the support center 401 judges whether the user of the image forming apparatus 210 presses again the call button 123 or not (Act 317). When the call button is pressed by the user (YES at Act 317), the process is returned to Act 302 and when the call button is not pressed (NO at Act 317), the operator is notified continuously.

When the voice message is not transmitted, thereafter, the same operation as that of the first embodiment shown in the flow chart (FIG. 6) will be performed.

Third Embodiment

After the support service for the user of the image forming apparatus 201 is performed in the first or second embodiment, the intra-machine information and user's emotional condition of the image forming apparatus 201 which are received by the support center 401 can be stored in the support center 401 as history data. The stored history data is accumulated, is checked for the mutual relation between the kind of a caused error, the user's emotional condition, and the error occurrence condition, and is fed back to the algorithm of maintenance service selection of the support center 401.

Figure 14:
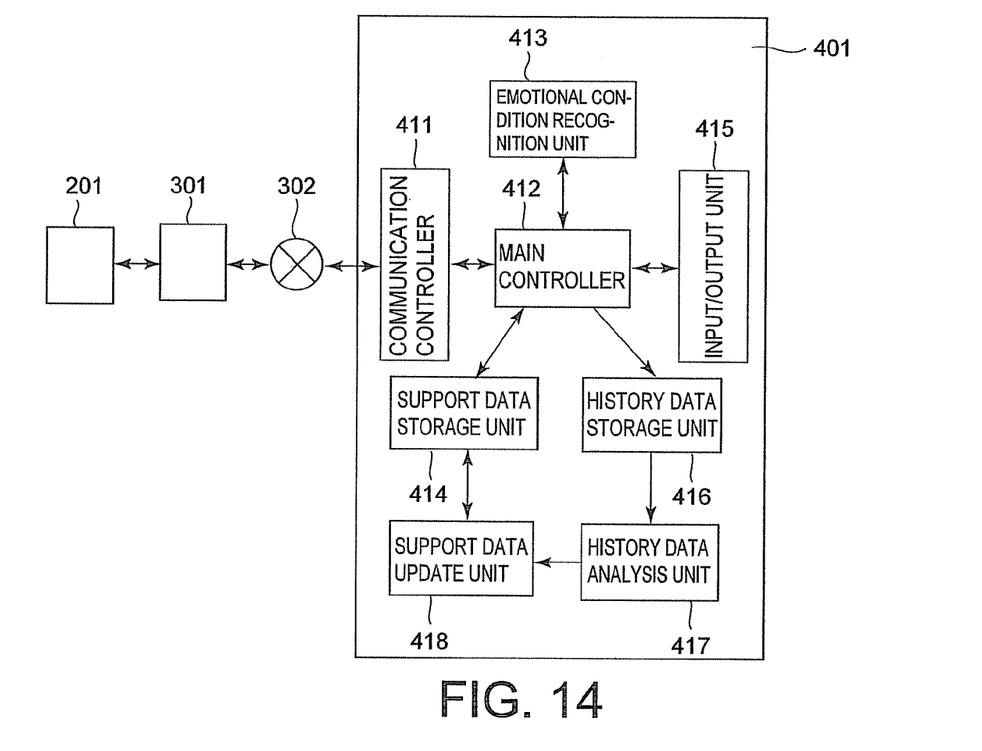
FIG. 14 is a block diagram showing the control of the support center of the third embodiment of the present invention.

FIG. 14 is a block diagram showing the constitution of the support center 401 of this embodiment.

Similarly to the first embodiment, the support center 401 includes the communication controller 411, main controller 412, emotional condition recognition unit 413, support data storage unit 414, and input/output unit 415 and also includes a history data storage unit 416 for storing history data, a history data analysis unit 417 for analyzing history data, and a support data update unit 418 for updating the table of the support information corresponding to the analytical results of the intra-machine information and user's emotional condition which are stored in the support data storage unit 414 from the analytical results of the history data.

Figure 15:
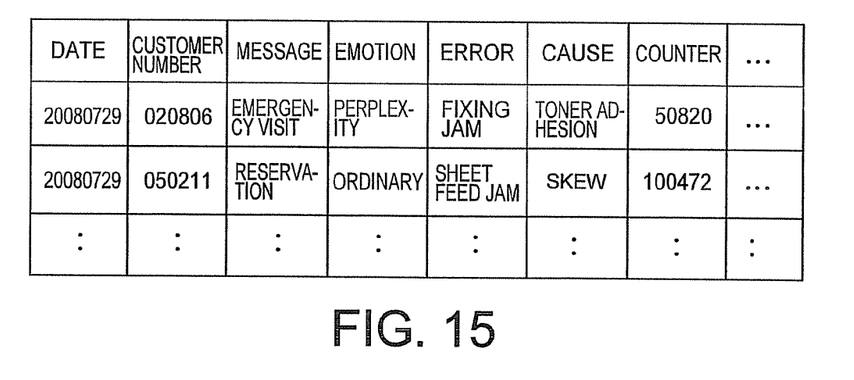
FIG. 15 is a table showing a record example of the history information recorded in the support center.

By use of such a constitution, the support center 401 selects the recommended maintenance service similarly to the first embodiment and supports the operator. Thereafter, the support center 401 stores the information and user's emotional condition information which are received from the image forming apparatus 201 in the history data storage unit 416 as history data. FIG. 15 shows an example of the history data recorded in the history data storage unit 416. And, the history data analysis unit 417 analyzes the history data and checks for a trend that there are many users having what a kind of emotion for what a kind of error.

From the analytical results, the support data update unit 418 updates the table of the support information corresponding to the analytical results of the intra-machine information and user's emotional condition as shown in FIG. 8. For example, when a sheet feed jam occurs due to the analysis of the history data, if a result is obtained that there are many users having an emotional condition judged as "angry", it is necessary to change the emergency degree of the support information to the sheet feed jam which is decided by the support center to a higher one. Therefore, the table of the support information is updated.

And, for the next and subsequent inquiries to the support center 401 by the user of the image forming apparatus 201, using the updated support information table, an appropriate maintenance service is selected.

As mentioned above, the mutual relation between the kind of a caused error, the user's emotional condition, and the error occurrence condition is checked from the history data stored in the support center 401 and from the results thereof, the support information indicated to the operator is updated whenever necessary. By this update, an appropriate maintenance service in a higher satisfactory degree of the user of the image forming apparatus 201 can be provided.

What is claimed is:

1. A maintenance system of an image forming apparatus comprising: an image forming apparatus including:
   an image forming unit configured to form an image;
   an information output unit configured to output intra-machine information of the image forming unit;
   a voice information input unit configured to input voice information of a user of the image forming unit;
   an emotional condition recognition unit configured to recognize the emotional condition of the user using the image forming apparatus from the voice information inputted by the voice information input unit; and
   a first communication controller configured to output the intra-machine information and the emotional condition information via a communication line; and
   a central management apparatus including:
   a second communication controller connected to the communication line to input the intra-machine information and emotional condition information outputted from the image forming apparatus;
   a support data storage unit configured to store beforehand support information corresponding to the intra-machine information and the emotional condition information;
   a main controller configured to extract the corresponding support information from the support information stored by the support information storage unit on the basis of the intra-machine information received by the second communication controller and the emotional condition of the user; and
   an input/output unit configured to report the support information extracted by an extraction means to an operator;
   wherein the central management apparatus further includes: a history data storage unit configured to store the intra-machine information received by the image forming apparatus and the emotional condition recognized using the emotional condition recognition unit as history data; a history data analysis unit configured to analyze a mutual relation between the intra-machine information and the emotional condition from the history data; and a support data update unit configured to update the support information stored by the support data storage unit on the basis of the results obtained by the history data analysis unit.

2. The maintenance system according to claim 1, wherein the first communication controller of the image forming apparatus tries connection of the image forming apparatus to the operator and when the connection cannot be established, transmits the number of non-connection times tried to the central management apparatus, and the central management apparatus receives the number of non-connection times, and when the received number of non-connection times exceeds a predetermined specified number of times, the main controller of the central management apparatus switches to a support in a high emergency degree.

3. The maintenance system according to claim 1, wherein the image forming apparatus has a microphone to receive a voice information of the user.

4. The maintenance system according to claim 1, wherein the image forming apparatus has a speaker to output the voice from the central management apparatus.

5. The maintenance system according to claim 1, wherein the image forming apparatus has a call button operated by the user so as to be able to request connection to the central management apparatus.

* * * * *